Sept. 28, 1954      E. S. TAMM      2,690,513
MOTOR COOLING SYSTEM
Filed Jan. 2, 1952

INVENTOR.
Emil S. Tamm
BY Alfred G. Gross
ATTORNEY.

Patented Sept. 28, 1954

2,690,513

UNITED STATES PATENT OFFICE 2,690,513

MOTOR COOLING SYSTEM

Emil S. Tamm, Plainfield, N. J., assignor to The Hoover Company, North Canton, Ohio, a corporation of Ohio Application January 2, 1952, Serial No. 264,503

8 Claims. (Cl. 310—62)

My present invention relates to the art of electric motors and in particular to an inexpensive, compact system for inducing a high volume flow of cooling air through the motor structure.

It is a more particular object of my present invention to provide an electric motor having a multiple impeller fan system characterized in that it does not require an axial motor length in excess of that required for a single impeller fan system. It is a further object of my invention to provide a motor cooling system having a multi-stage cooling fan system so constructed that the supporting disc for one stage forms an interstage seal and a protective bell around one of the motor bearings. It is a further object of my invention to provide an electric motor having a multi-stage cooling fan system including an interstage re-directing structure so arranged that the rotating parts of the motor, including the cooling fan discs and blades are free to be slid axially into and out of the main motor housing without interference with the inter-stage, re-directing structure.

Figure 2:
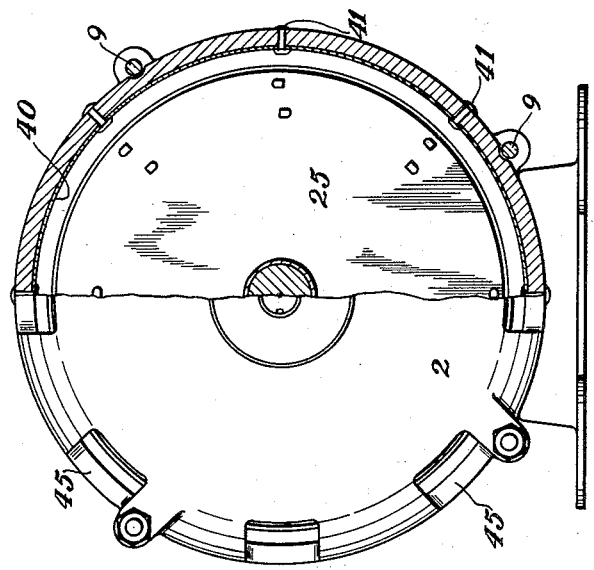
Figure 1:
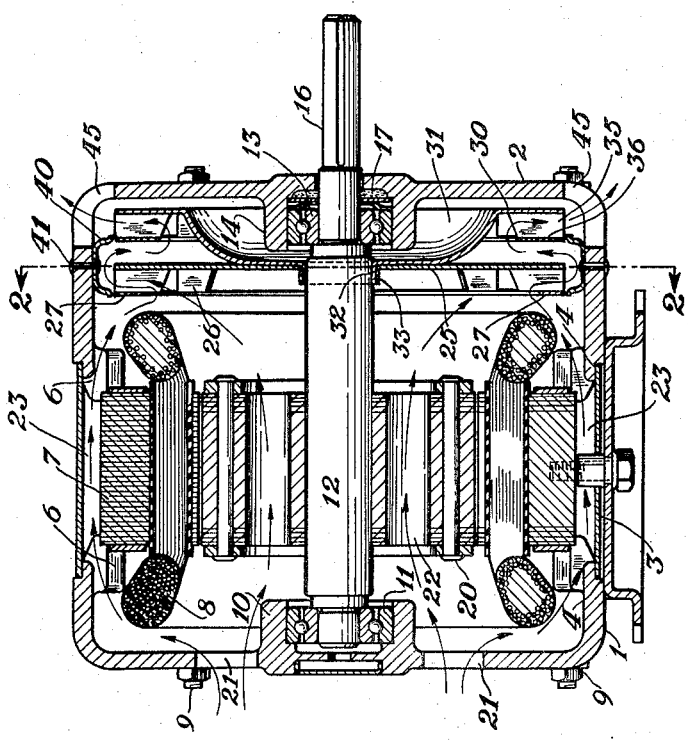

Other objects and advantages of the invention will become apparent as the description proceeds when taken in connection with the accompanying drawing, in which:

Figure 1 is a longitudinal sectional view through an electric motor embodying my invention; and Figure 2 is a half-sectional view taken along the line 2—2 of Figure 1 and looking in the direction of the arrows.

Referring now to the drawing in detail, and first to Figure 1 thereof, the motor housing consists of left and right hand end bell structures 1 and 2 respectively, as viewed in Figure 1 separated by a central ring 3 abutting suitable shoulders 4 formed on the facing ends of the end bells 1 and 2. The end bells 1 and 2 are each provided with a plurality of inwardly extending lugs 6 which engage a laminated stator structure 7 carrying stator windings 8 and support the stator 7 in spaced relation to the ring 3. The end bells 1 and 2, center ring 3 and stator structure 7 are held together by through bolts 9 extending completely through the end bells and drawing the above mentioned parts together. The end bell 1 is provided with a closed inwardly directed cup 10 carrying a ball bearing structure 11 in which is mounted one end of a motor shaft 12. The other end of the motor shaft 12 is supported by a ball bearing structure 13 carried by an inwardly directed cup 14 on the end bell 2. The shaft 12 is provided with a driving extension 16 projecting through a sealing structure 17 and the end wall of the motor end bell 2. As illustrated in the drawing, a laminated squirrel-cage type induction motor rotor 20 is mounted upon the shaft 12 and is aligned with the central stator structure 7.

The motor end bell 1 is provided with a plurality of air inlet openings 21 surrounding the bearing 10 to admit cooling air into the motor housing structure. The rotor 20 is provided with a plurality of circumferentially spaced, axially extending holes or openings 22 extending therethrough to provide a cooling air flow through the rotor structure for the purpose of cooling the same. The stator ring supporting lugs 6 space the periphery of the stator structure 7 radially inwardly of the ring 3 and end bells 1 and 2 to provide air passages 23 providing air flow paths across the windings 8 and circumferentially of the stator structure as shown by the arrows.

A cooling air flow through the motor structure is induced by a fan structure comprising a first stage fan disc 25 which extends from a mounting on the shaft 12, to be described more fully hereinafter, to a point spaced from the surrounding portion of the end bell 2. A plurality of radial fan blades 26 are mounted on the disc 25 adjacent the periphery thereof and extend axially of the motor shaft towards the stator structure. An annular closure ring 27 is suitably secured to the edges of the blades 26 adjacent the motor stator structure. The ring 27 and blades 26 and disc 25 thus provide a plurality of radially extending pumping passageways opening toward the center of the motor housing and discharging toward the spaced surrounding wall of the end bell 2. The motor is provided with a second fan comprising an annular ring 30 integrally joined to a cup-shaped section 31 receiving the bearing cup 14 and bearing at its bottom upon the rear face of the fan disc 25. The central part of the cup 31 is provided with a cylindrical sleeve section 32 secured to the motor shaft 12 as by pressing or in any other suitable manner. The disc 25 is provided with a central cylindrical sleeve 33 seating upon the sleeve 32 to which it is secured by welding or pressing. Thus both fan supporting members are secured to the same portion of the shaft 12. The annular ring 30 is provided with a plurality of radial fan blades 35 which are joined to an annular ring 36 at the edges thereof closest to the stator 7. The inner ends of the blades 35 terminate in spaced relation to the cup 31 to provide an axial air inlet to the spaces between adjacent blades and the ring 36 is spaced from the disc 25 to provide an air inlet passageway therebetween.

Cooling air discharged by the first fan section is re-directed into the space between the fans toward the axis of the second fan by an annular air directing member 40. The annular member 40 is channel-shaped in cross section and spans the axial distance between the annular rings 27 and 36 as shown in Figure 1. The member 40 is secured to the inner surface of the end bell 2 in any suitable manner, herein shown as a plurality of circumferentially spaced rivets 41. The edges of the side walls of the annular channel-shaped member 40 terminate closely adjacent to the outer edges of the rings 27 and 36 but in spaced relation thereto to provide running clearance without allowing a significant free air passage between the channel 40 and fan structures. Air is discharged by the second fan axially beyond the limits of the re-directing member 40, and is exhausted from the motor casing through openings 45 formed in the peripheral portion of the end bell 2 at the corner thereof.

The re-directing structure is shown as a one piece channel member as that is the preferred construction; however, the member 40 effectively consists of a pair of air flow blocking rings spaced axially of the fan shaft and extending from the periphery of each fan at the inlet face thereof to the surrounding end bell.

The radial distance from the shaft axis to the inner faces of the lugs 6 must exceed the maximum radial dimension of the fan structure to permit facile assembly or disassembly of the motor structure. The present multi-stage fan structure satisfies the facile assembly problem by separating the inter-stage, re-directing structures along the fan periphery into parts carried by the rotor assembly and parts carried by the motor frame.

The foregoing cooling fan construction provides a multi-stage cooling fan structure in which the re-directing member between the two stages consists of a channel shaped member carried by the motor end bell and in which the axial seal between adjacent stagings of the fan is provided by the backing plate for the second stage. It is also apparent from the foregoing that the nested relationship between the second stage of the fan and the motor bearing cup 14 permits the second stage to occupy otherwise unusable space and to be placed in the motor without requiring any increase in the axial length thereof.

By providing a multi-stage cooling fan system as above described, a given motor frame specification can be utilized while increasing the power output thereof due to the high velocity and highly turbulent air flow across the windings which enable the same to operate at high current densities without exceeding safe temperature limits. This has the net result of increasing the power output from the given motor frame or conversely, permitting the use of a smaller motor frame for a given power output, resulting in a saving in material, weight and bulk.

While the invention has been illustrated and described in detail herein, it is not to be limited thereto but various changes may be made in the construction, design and arrangement of parts without departing from the spirit of the invention or the scope of the appended claims.

I claim:

1. In an electric motor having a frame structure including end bells, a stator mounted within said frame structure, a rotor positioned within said stator, bearing structures carried by each of said end bells and projecting inwardly of said frame, a shaft journaled in said bearing structure and supporting said rotor, a first ventilating fan mounted on said shaft, a second ventilating fan mounted on said shaft and having a mounting plate secured to said shaft coincidentally with said first fan and being dished to receive one of said bearing structures and to position the air inlet and outlet portions thereof in spaced relation to said first fan, and an air directing structure carried by said frame including means forming air flow blocking members axially of said casing around the air inlet faces of each of said fans.

2. In an electric motor having a frame structure, a stator mounted within said frame structure, a bearing on said frame structure projecting inwardly of said frame structure at one end thereof, a shaft rotatably mounted in said bearing and a rotor carried by said shaft, the combination of a first ventilating fan surrounding said bearing and carried by an impervious dished plate receiving said bearing and secured to said shaft adjacent said bearing, a second ventilating fan positioned in spaced relation to said first fan and carried by an impervious plate attached to said dished plate, and an air directing structure carried by said frame and including a pair of spaced members each having running clearance with the periphery of one of said fans at the air inlet side thereof and joined to said frame around said fans.

3. In an electric motor having a frame structure, a stator mounted within said frame structure, a bearing on said frame structure projecting inwardly of said frame structure at one end thereof, a shaft rotatably mounted in said bearing and a rotor carried by said shaft, the combination of a first ventilating fan surrounding said bearing and carried by an impervious dished plate receiving said bearing and secured to said shaft adjacent said bearing, a second ventilating fan positioned in spaced relation to said first fan and carried by an impervious plate attached to said dished plate, a channel member having a base portion secured to said frame around said fans and side flanges each surrounding the peripheral portion of one of said fans in the plane of the air inlet faces thereof.

4. In an electric motor, a frame structure including a pair of end bells each having an inwardly extending bearing, a stator within said frame, a motor shaft mounted in said bearings, a rotor carried by said shaft, a first ventilating fan in said frame having a peripheral discharge portion spaced from said frame and a plane back plate, a second ventilating fan in said frame having a peripheral discharge portion spaced from said frame and a back plate dished at its central portion and extending through the inlet portion of said second fan to engage the back plate of said first fan, said back plates being carried by said shaft adjacent one of said bearings with said one bearing lying within the dished portion of said second back plate, and means for directing air discharged by said first fan to said second fan including annular air flow blocking members extending between the peripheral portion of each of said fans at the air inlet side thereof and said frame.

5. Apparatus according to claim 4 in which said frame includes spaced inwardly projecting members for supporting said stator from the outer wall of said frame to form air flow passages around said stator and said rotor is provided with cooling air passages therethrough.

6. Apparatus according to claim 5 in which the radial distance from the axis of said shaft to said projecting members exceeds the radium of said fans.

7. Apparatus according to claim 4 in which said air directing means comprises an annular member which is channel-shaped in cross section, and said annular member is mounted with the base of the channel engaging said frame and the flanges thereof extending inwardly toward said fans.

8. Apparatus according to claim 4 in which the end bell including said one bearing is provided with a plurality of air exhaust ports around said second fan and the other of said end bells is provided with air inlet ports around the bearing carried by said other end bell.

References Cited in the file of this patent

UNITED STATES PATENTS

| Number | Name | Date |
| --- | --- | --- |
| 1,622,827 | Hanson | Mar. 29, 1927 |
| 2,604,501 | Wightman | July 22, 1952 |

FOREIGN PATENTS

| Number | Country | Date |
| --- | --- | --- |
| 106,646 | Austria | June 10, 1927 |
| 331,407 | Germany | Jan. 6, 1921 |
| 515,766 | Germany | Jan. 12, 1931 |